US012502243B2

(12) United States Patent  
Gaudreau et al.

(10) Patent No.: US 12,502,243 B2
(45) Date of Patent: Dec. 23, 2025

(54) FORCE-SENSING RIB CLIP

(71) Applicant: Zimmer, Inc., Warsaw, IN (US)

(72) Inventors: Jeremie Gaudreau, Ottawa (CA); Mitchell Muir, Philadelphia, PA (US); Hillary Overholser, Goshen, IN (US); Aleks Kostov, Uxbridge (CA)

(73) Assignee: Zimmer, Inc., Warsaw, IN (US)

( * ) Notice: Subject to any disclaimer, the term of this patent is extended or adjusted under 35 U.S.C. 154(b) by 140 days.

(21) Appl. No.: 18/489,768

(22) Filed: Oct. 18, 2023

(65) Prior Publication Data

US 2024/0130824 A1 Apr. 25, 2024
US 2024/0225774 A9 Jul. 11, 2024

Related U.S. Application Data

(60) Provisional application No. 63/418,814, filed on Oct. 24, 2022.

(51) Int. Cl.
*A61B 17/02* (2006.01)
*A61B 90/00* (2016.01)

(52) U.S. Cl.
CPC .......... *A61B 90/06* (2016.02); *A61B 17/0206* (2013.01); *A61B 2090/064* (2016.02);
(Continued)

(58) Field of Classification Search
CPC ................ A61B 17/0206; A61B 17/02; A61B 2017/00221; A61B 2090/064;
(Continued)

(56) References Cited

U.S. PATENT DOCUMENTS 4,726,356 A 2/1988 Santilli et al.
6,312,377 B1* 11/2001 Segermark ............. A61B 17/02
600/210
(Continued)

OTHER PUBLICATIONS

Bolotin, G., "Tissue-disruptive forces during median sternotomy", Heart Surg Forum. 2007; 10(6):487-92, (Aug. 7, 2007), 6 pgs.
(Continued)

*Primary Examiner* — Samuel S Hanna
(74) *Attorney, Agent, or Firm* — SCHWEGMAN LUNDBERG & WOESSNER, P.A.

(57) ABSTRACT

A force-sensing rib clip comprises an upper shell, a lower shell and a rib clip. The upper shell comprises an elongate body, an exterior surface of the elongate body, a rib-receiving channel extending along an interior surface of the upper shell and a ridge extending along the rib-receiving channel. The lower shell is configured to mate with the exterior surface. The load cell is positioned between the upper shell and the lower shell. A method of receiving feedback during a rib retraction procedure comprises attaching a force-sensing rib clip to a first rib bone, inserting a rib retractor into an intercostal space between the first rib bone and a second rib bone, applying retraction force to the first rib bone and the second rib bone through the force-sensing rib clip, outputting force-sensor data from the force-sensing rib clip to an interrogation device, and displaying force indicia on the interrogation device.

10 Claims, 8 Drawing Sheets

(52) U.S. Cl.
    CPC ............. *A61B 2562/0252* (2013.01); *A61B 2562/0261* (2013.01); *A61B 2562/164* (2013.01)

(58) Field of Classification Search
    CPC ...... A61B 2090/065; A61B 2562/0252; A61B 2562/0261; A61B 2562/164; A61B 90/06
    See application file for complete search history.

(56) References Cited

U.S. PATENT DOCUMENTS 8,915,845 B2    12/2014   Pell et al.
9,402,610 B2    8/2016    Pell et al.

OTHER PUBLICATIONS

Bolotin, G., "A novel instrumented retractor to monitor tissue-disruptive forces during lateral thoracotomy", The Journal of Thoracic and Cardiovascular Surgery, vol. 133, Issue 4, 2007, pp. 949-954, https: www.sciencedirect.com science article pii S0022522306020496, (2007), 6 pgs.

Chanoit, G., "Retraction mechanics of Finochietto-style self-retaining thoracic retractors", BioMed Eng OnLine 18, 45, 2019., (2019), 12 pgs.

* cited by examiner

FORCE-SENSING RIB CLIP

CLAIM OF PRIORITY

This application claims the benefit of U.S. Provisional Patent Application Ser. No. 63/418,814, filed on Oct. 24, 2022, the benefit of priority of which is claimed hereby, and which is incorporated by reference herein in its entirety.

TECHNICAL FIELD

The present disclosure is generally directed to, but not by way of limitation, systems, devices and methods for performing, monitoring and evaluating medical procedures, such as thoracotomy procedures. More specifically, but not by way of limitation, the present disclosure is directed to medical instruments that incorporate sensors.

BACKGROUND

Thoracotomy procedure involve accessing anatomy within the thorax of a patient. Often times, it is advantageous to access anatomy within the rib cage of the patient. In order to access anatomy within the rib cage, or more particularly, behind a column of vertebrosternal ribs forming one side of the rib cage, it can be advantageous to increase the natural anatomic distance between adjacent ribs, such as with a rib retractor, in order to provide a larger access portal. Typically, a surgeon performs a rib retraction procedure based on experience and direct feedback from the patient. For example, a surgeon will rely on experience in determining how much force to apply to a rib retractor to avoid causing post-operative pain or discomfort for the patient. Furthermore, surgeons can utilize feedback form the patient, such as sounds coming from the rib cage to evaluate when ribs cannot be retracted any further. However, it can be difficult to intra-operatively evaluate thoracotomy procedures in order to avoid producing trauma, such as rib fracture or nerve damage, that generates post-operative discomfort.

Attempts have been made to prevent inducing trauma during thoracotomy procedures. U.S. Pat. No. 6,312,377 to Segermark et al. is titled "Soft Tissue Compression Shield and Method of Retracting Tissue." U.S. Pat. No. 9,402,610 to Pell et al. is titled "Rib-Protecting Devices for Thoracoscopic Surgery, and Related Methods." U.S. Pat. No. 8,915,845 to Pell et al. is titled "Methods and Devices to Decrease Tissue Trauma During Surgery."

OVERVIEW

The present inventors have recognized, among other things, that problems to be solved in evaluating thoracotomy procedures involve the difficulty in assessing the force being applied to rib bones with retracting devices. For example, it has been proposed to apply shields to bones being retracted to prevent trauma in order to reduce the need for knowing the magnitude of force being applied. However, such shields do not provide any feedback regarding the force being applied and, thus, cannot facilitate predicting if trauma is being induced, particularly post-operative pain or discomfort. Furthermore, such shields do not provide feedback that can help determine if the shield is misapplied, i.e., incorrectly attached to a rib bone. Additionally, force-sensing retractors have been proposed to provide feedback. However, such retractors require the surgeon to adapt preferred surgical techniques for use with the force-sensing retractors, such as being required to foregoing using preferred retractors in favor of the force-sensing retractor. Furthermore, sensor-enabled retractors provide force feedback in the direction that the retractor applies force, which may not always align with the direction it is desired to obtain feedback, such as on the inferior-most point of a rib bone.

The present subject matter can provide solutions to these and other problems, such as by providing sensor-enabled rib clips that can provide real-time feedback to a surgeon performing a thoracotomy procedure. The rib clips can have electronics components disposed therein that can, for example, sense forces being applied to the rib clip and transmit collected data out of the rib clip to an interrogation device that can display the data. The rib clip can provide direct shielding to the rib bone and can be shaped to avoid transmitting retraction force to nerves extending along the rib bone, such as the intercostal nerve bundle.

1) The present subject matter provides rib clips that can be used with any retractor, thereby allowing surgeons to continue to use preferred instrumentation.
2) The present subject matter provide rib clips that can provide force feedback for a desired direction relative to a rib bone, regardless of the specific orientation of the rib retractor.
3) The present subject matter provides rib clips that can be disposable, thereby reducing the difficulty in cleaning and sterilizing force-sensing retractors.
4) The present subject matter provides rib clips that can include additional sensing capabilities providing feedback in addition, or alternatively, to force data, such as accelerometers and proximity sensors.

Benefits of the devices, systems and methods of the present disclosure can include:
1) Reduction in post-operative pulmonary complications, hospital stay lengths and intraoperative rib fractures.
2) Reduction in chronic pain, thereby also reducing use of pain medications.

In an example, a force-sensing rib clip can comprise an upper shell, a lower shell and a rib clip. The upper shell comprising an elongate body, an exterior surface of the elongate body, a rib-receiving channel extending along an interior surface of the upper shell and a ridge extending along the rib-receiving channel. The lower shell is configured to mate with the exterior surface. The load cell is positioned between the upper shell and the lower shell.

In another example, a method of receiving real-time feedback during a rib retraction procedure using a force-sensing rib clip can comprise attaching a first force-sensing rib clip to a first rib bone, inserting a rib retractor into an intercostal space between the first rib bone and a second rib bone inferior of the first rib bone, establishing a wireless communication link between the first force-sensing rib clip and an interrogation device, applying a retraction force to the first rib bone and the second rib bone, wherein the retraction force is applied to the first rib bone through the first force-sensing rib clip, outputting force-sensor data from the first force-sensing rib clip to the interrogation device, and displaying force indicia on the interrogation device.

DETAILED DESCRIPTION

Figure 1:
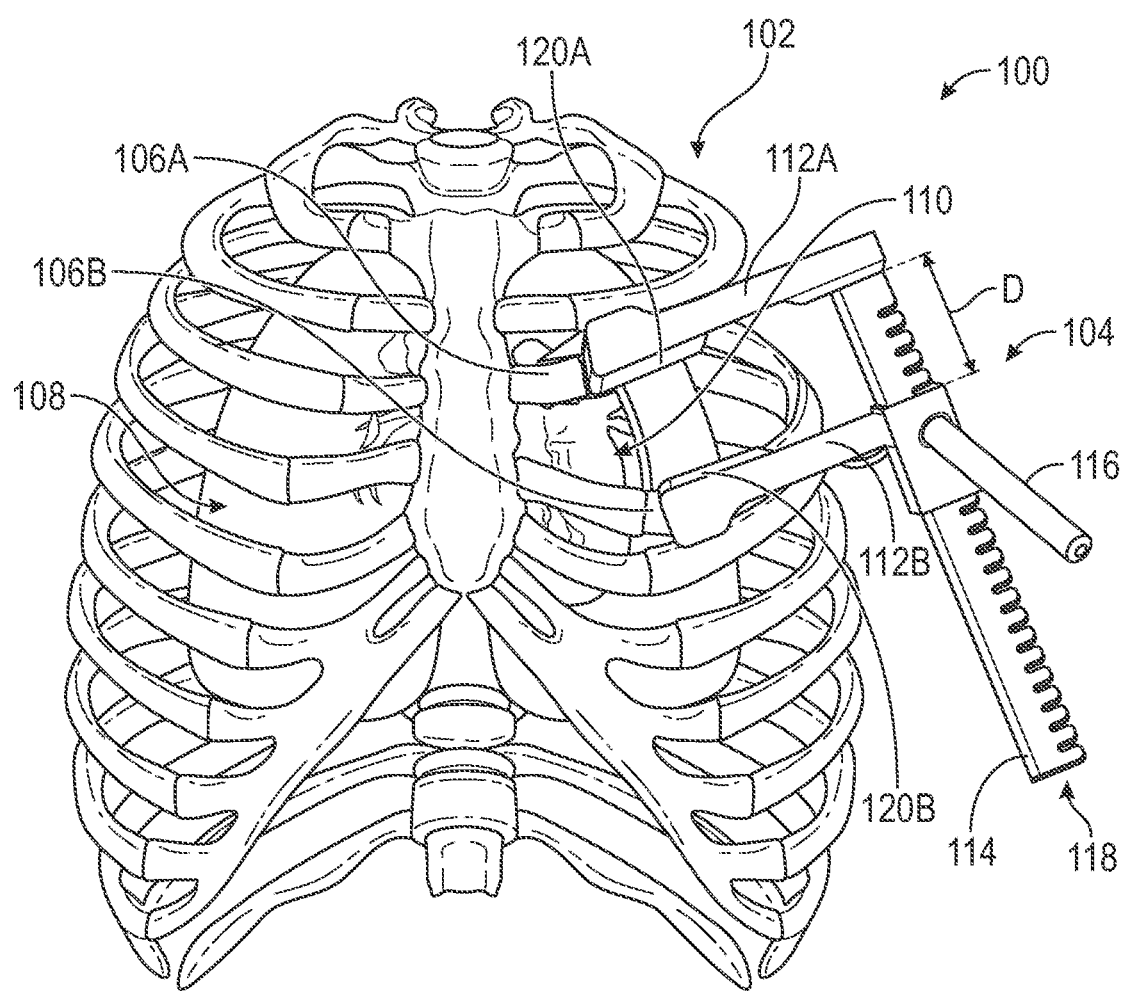
FIG. 1 is a diagrammatic illustration of a thorax comprising a rib cage being prepared for a thoracotomy procedure with a rib retractor.

FIG. 1 is a diagrammatic illustration of thorax 100 comprising rib cage 102 being prepared for a thoracotomy with rib retractor 104. Rib cage 102 can include a column or array of rib bones, including superior rib bone 106A and inferior rib bone 106B. Thorax 100 can include anatomy within rib cage 102, such as lungs 108 and heart 110. Rib retractor 104 can comprise fixed blade 112A, mobile blade 112B, track 114 and handle 116. Fixed blade 112A can be attached to distal end of track 114 so that relative movement therebetween is immobilized. Mobile blade 112B can be configured to slide along track 114. Handle 116 can include a ratchet mechanism to engage teeth 118. Thus, handle 116 can be reciprocated to move mobile blade 112B along track 114. Teeth 118 can immobilize mobile blade 112B at the location of each of teeth 118 as positioned by handle 116. As such, mobile blade 112B can be positioned adjacent, e.g., in contact with, fixed blade 112A to minimize distance D and facilitate insertion of fixed blade 112A and mobile blade 112B between superior rib bone 106A and inferior rib bone 106B with the natural anatomic spacing therebetween. Thereafter, handle 116 can be operated to move mobile blade 112B along track 114, thereby increasing distance D. Teeth 118 can hold mobile blade 112B in a stationary position to hold superior rib bone 106A and inferior rib bone 106B in retracted positions where distance D is greater than the natural anatomic spacing, thereby providing a larger opening or access portal between superior rib bone 106A and inferior rib bone 106B to provide access to lungs 108, heart 110 and other anatomy. In examples, the natural anatomic spacing between superior rib bone 106A and inferior rib bone 106B can be increased approximately six to eight centimeters. As such, a large access portal can be provided between rib bone 106A and inferior rib bone 106B to allow access to lungs 108 for the removal of cancerous tissue, for example.

Examples of rib retractors suitable for use with the present disclosure are described in U.S. Pat. No. 4,726,356, titled "Cardiovascular and Thoracic Retractor" to Santilli et al., which is hereby incorporated by this reference in its entirety.

Fixed blade 112A can include flange 120A and mobile blade 112B can include flange 120B. Flange 120A can extend generally orthogonally from fixed blade 112A to fit under, e.g., against the inferior side of superior rib bone 106A. Flange 120B can extend generally orthogonally from mobile blade 112B to fit on top of, e.g., against the superior side of inferior rib bone 106B. As such, flange 120A and flange 120B can exert force against superior rib bone 106A and inferior rib bone 106B in a generally superior-inferior direction when handle 116 is actuated.

Each rib bone of rib cage 102 can include soft tissue, such as muscle and nerve bundles. In particular, rib bones can include nerves, e.g., intercostal nerves, that are located at a distal and posterior location against the rib bone. As such it can be possible for flange 120A of fixed blade 112A to press up against these nerves and cause pain, trauma and damage, in addition to the potential for fracture of the rib bones themselves due to the retraction procedure.

The force-sensing rib clips of the present disclosure discussed with reference to FIGS. 2-12 can be attached to superior rib bone 106A and inferior rib bone 106B to provide direct shielding from forces applied by rib retractors. Furthermore, the rib clips of the present disclosure can be shaped to provide protection to intercostal nerves on superior rib bone 106A that receives retraction force from an inferior direction. Additionally, the rib clips of the present disclosure can provide output in the form of electronic sensor data that can be displayed on an interrogation device to provide a numerical indication of force being applied to superior rib bone 106A and inferior rib bone 106B. Such raw force data can additionally be automatically interpreted by the interrogation device based on comparison to statistical anatomic databases, for example, to provide guidance for the rib retracting procedure that can be output on the interrogation device.

Figure 2:
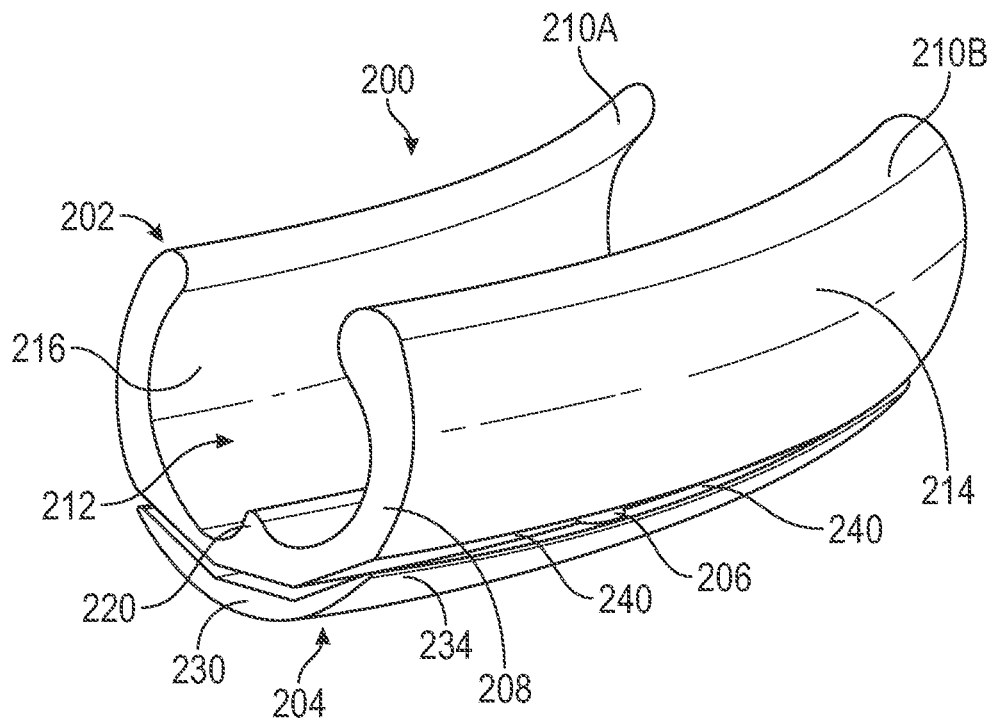
FIG. 2 is a perspective view of a force-sensing rib clip of the present application.
Figure 3:
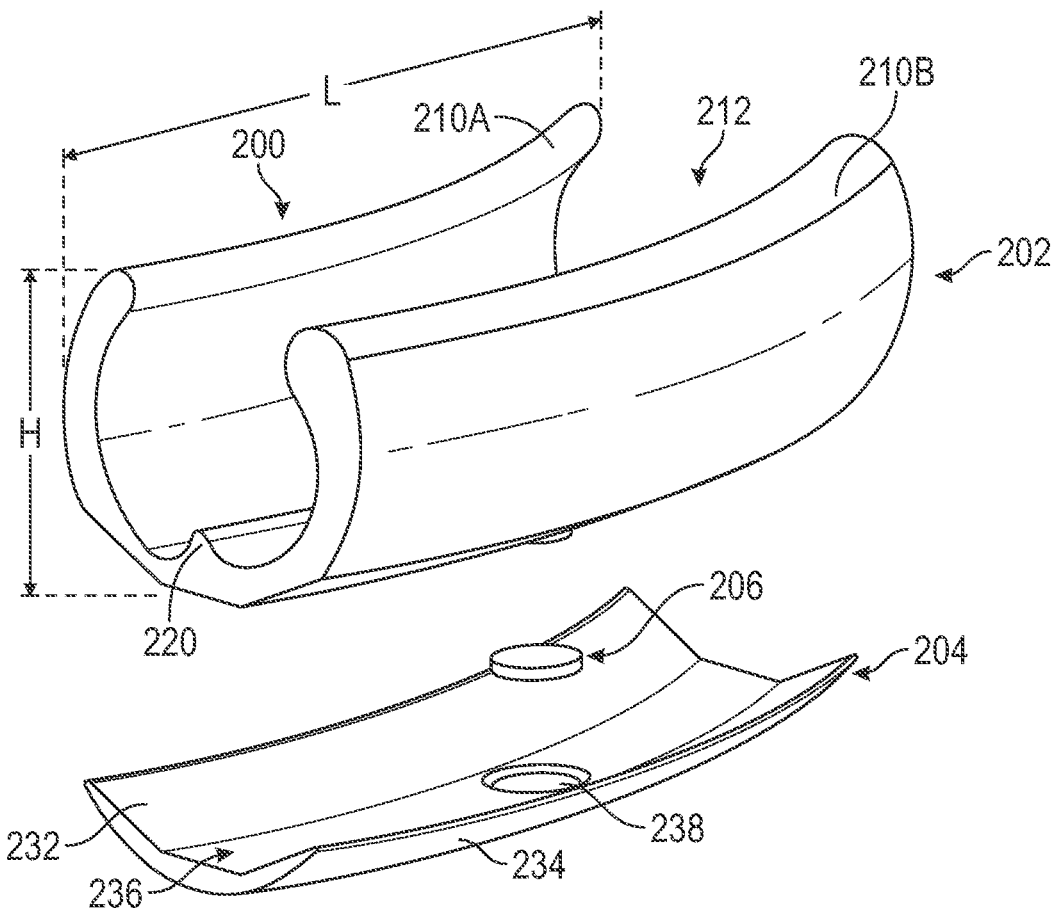
FIG. 3 is an exploded view of the force-sensing rib clip of FIG. 2 comprising a top shell, a bottom shell and a load cell.

FIG. 2 is a perspective view of force-sensing rib clip 200 of the present disclosure. FIG. 3 is an exploded view of force-sensing rib clip 200 of FIG. 2 comprising top shell 202, bottom shell 204 and load cell 206. FIGS. 2 and 3 are discussed concurrently.

Upper or top shell 202 can comprise elongate body 208 having first arm 210A and second arm 210B forming channel 212 therebetween. Elongate body 208 can have external surface 214 and internal surface 216. Internal surface 216 can include ridge 220.

Lower or bottom shell 204 can comprise elongate body 230 having internal surface 232 and external surface 234. Elongate body can be arcuate to form trough 236 (FIG. 3). Internal surface 232 can include socket 238 (FIG. 3) for load cell 206.

Top shell 202 can be shaped to attach to a rib bone. In particular, a rib bone can be positioned within channel 212. In examples, first arm 210A can be configured to be positioned on a posterior side of a rib bone within the thorax and second arm 210B can be configured to be positioned on an anterior side of a rib bone outside of the thorax. As such, top shell 202 can be configured to be positioned on the underside or inferior side of a rib bone, with ridge 220 being in contact with the rib bone. However, in other examples, top shell 202 can be configured to be positioned on the top or superior side of a rib bone, in which case ridge 220 can be omitted. However, it is contemplated that a single design of top shell 202 incorporating ridge 220 can be used for inferior side and superior side placement. Elongate body 208 can be arcuate or curved to conform to the general curvature of a rib bone and can be placed on the right side or left side of the rib cage.

Ridge 220 can be configured to be positioned on an inferior side of a rib bone in a location where soft tissue is minimal or absent and particularly where nerves are absent. As discussed in greater detail with reference to FIGS. 8 and 9, ridge 220 can be configured to be positioned alongside nerve structure 302 (FIG. 9), to provide clearance between the inferior surface of a rib bone and internal surface 216 of top shell 202. Top shell 202 can be made from a material, such as a polymer, that is tough to provide resistance to force applied by a rib retractor, but that allows first arm 210A and second arm 210B to flex a minimal amount to fit around a rib bone. Top shell 202 can provide a barrier to force from a retractor blade being applied to the rib bone. Ridge 220 can directly counteract the retraction force. Furthermore, first arm 210A and second arm 210B can clamp onto the rib bone to resist the retraction force. First arm 210A, second arm 210B and ridge 220 can provide three points of contact for stability, but also allow for the formation of pockets or gaps between top shell 202 and soft tissue. As such, top shell 202 can shield the rib bone from direct retraction forces.

Bottom shell 204 can comprise an arcuate body configured to oppose external surface 214 of top shell 202. As such, bottom shell 204 can be arcuate and can be as wide and as long as top shell 202 or smaller. However, bottom shell 204 can be wider or longer than top shell 202. In examples, rib clip 200 can have length L, which can be approximately fifty millimeters, and height H, which can be approximately fifteen millimeters. External surface 234 of bottom shell 204 can be arcuate to facilitate transferring of force to load cell 206, such as by facilitating point contact with flange 120A (FIG. 1) of fixed blade 112A of rib retractor 104. Trough 236 can be shaped to follow the general curvature of external surface 214 to allow for the formation of gap 240. Bottom shell 204 can be made from a polymer material that can transmit retraction force to load cell 206.

Load cell 206 can be positioned between bottom shell 204 and top shell 202 within gap 240. Load cell 206 can provide the coupling between bottom shell 204 and top shell 202. Thus, as a rib retractor applies force to bottom shell 204, the force can be transmitted to load cell 206 to allow load cell 206 to accurately read forces being applied to bottom shell 204. That is, bottom shell 204 can be attached to top shell 202 in such a manner that forces applied by a rib retractor are not absorbed by bottom shell 204 or rib clip 200 in general so that load cell 206 can accurately read force being applied by the rib retractor. Thus, load from a rib retractor applied to bottom shell 204 can be directly imparted to load cell 206. In examples, gap 240 can be filled with a deformable or compressible material to prevent ingress of biological material into gap 240, thereby also protecting load cell 206. In examples, a foam or deformable polymer layer can be placed in gap 240. For example, internal surface 232 can be coated with a foam material to surround socket 238 and occupy the space of gap 240. In additional examples, springs, such as leaf springs or coil springs, can be positioned between top shell 202 and bottom shell 204 to hold bottom shell 204 in place relative to top shell 202. The springs can be overcome by the retraction force to allow the retraction force to register with load cell 206.

Load cell 206 can comprise an electronics module comprising one or more sensors and wireless communication devices. In the illustrated example, load cell 206 is configured as a single component having a housing in which are disposed all of the sensing and communication electronics. However, in other configurations, one or more sensors can be located remotely from the main housing. In various configurations, load cell 206 can comprise a pressure sensor, such as a strain gauge or a piezoelectric sensor, or a load cell, such as a force sensing transducer, configured to measure or sense force applied thereto and a wireless communication sensor, such as a Bluetooth antenna. As illustrated in FIGS. 1 and 2, load from a rib retractor applied to bottom shell 204 can be directly transmitted to a pressure sensor within load cell 206. As such, the exterior housing of load cell 206 can receive the force or the housing for load cell 206 can include appropriate windows or buttons to receive the force.

Figure 4:
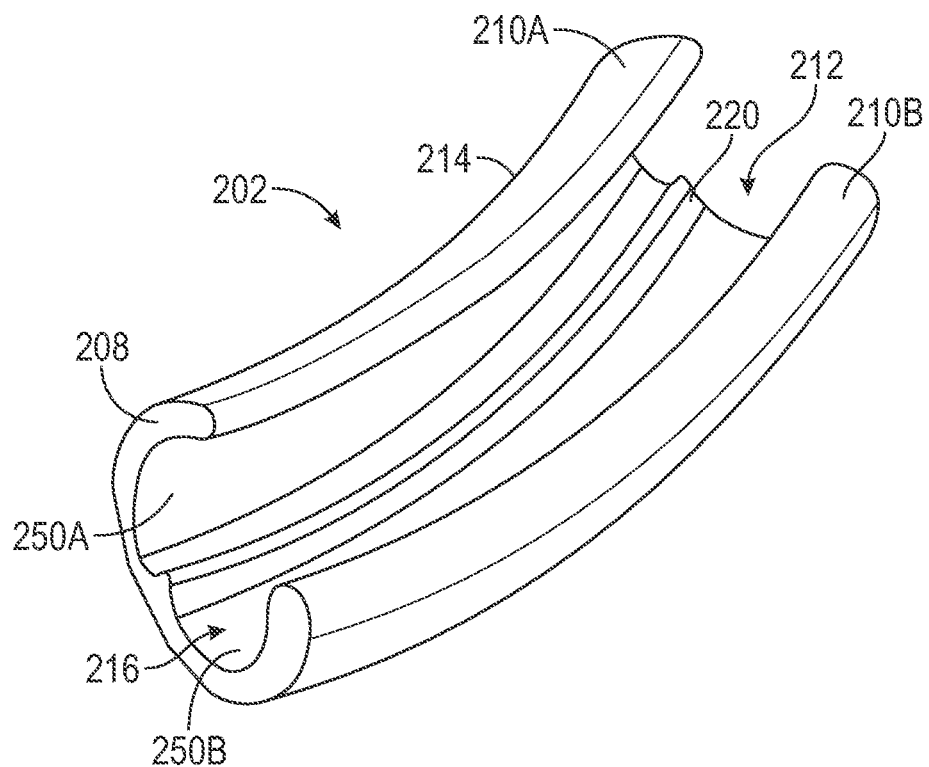
FIG. 4 is a perspective view of an interior of the top shell of FIGS. 2 and 3 showing a rib-receiving channel and a nerve-protecting ridge.
Figure 5:
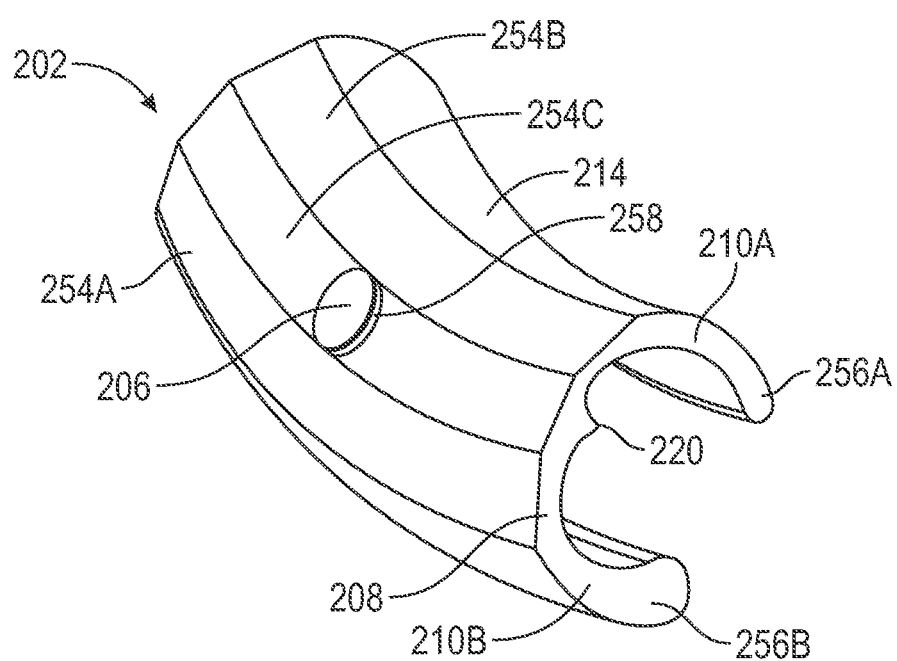
FIG. 5 is a perspective view of an exterior of the top shell of FIGS. 2 and 3 showing a location for a load cell.

FIG. 4 is a perspective view of an interior of top shell 202 of FIGS. 2 and 3 showing rib-receiving channel 212 and nerve-protecting ridge 220. FIG. 5 is a perspective view of an exterior of top shell 202 of FIGS. 2 and 3 showing a location for load cell 206. FIGS. 4 and 5 are discussed concurrently.

Internal surface 216 can comprise anterior pocket 250A and posterior pocket 250B on either side of ridge 220. Anterior pocket 250A and posterior pocket 250B can comprise extensions of channel 212.

External surface 214 can comprise anterior panel 254A, posterior panel 254B and center panel 254C. Anterior panel 254A, posterior panel 254B and center panel 254C can comprise flat portions of external surface 214 that allow bottom shell 204 to be brought into close proximity to top shell 202 without contact.

First arm 210A and second arm 210B can terminate at first tip 256A and second tip 256B, respectively. First tip 256A and second tip 256B can comprise blunted or rounded tips configured to engage a surface of a rib bone, thereby forming a point contact. First arm 210A can join to posterior panel 254B and second arm 210B can join to anterior panel 254A. First arm 210A can be curved between first tip 256A and posterior panel 254B, e.g., concave relative to channel 212. Second arm 210B can be curved, e.g., concave, between second tip 256B and anterior panel 254A, e.g., concave relative to channel 212. At channel 212 first arm 210A and second arm 210B can join to ridge 220. First tip 256A, second tip 256B and ridge 220 can form three points of contact with a bone. Anterior pocket 250A can be located within the curvature of first arm 210A between first tip 256A and ridge 220. Posterior pocket 250B can be located within the curvature of second arm 210B between second tip 256B and ridge 220.

Anterior panel 254A, posterior panel 254B and center panel 254C can form surfaces configured to oppose trough 236 of bottom shell 204. In particular, center panel 254C can be located at an inferior-most point away from the center of top shell 202. Center panel 254C can comprise a surface for mating with load cell 206. Center panel 254C can include pedestal 258 onto which load cell 206 can be mounted. Pedestal 258 can ensure that force applied to load cell 206 can be squarely imparted to top shell 202. As such, pedestal 258 can act as a force concentrator.

Figure 6:
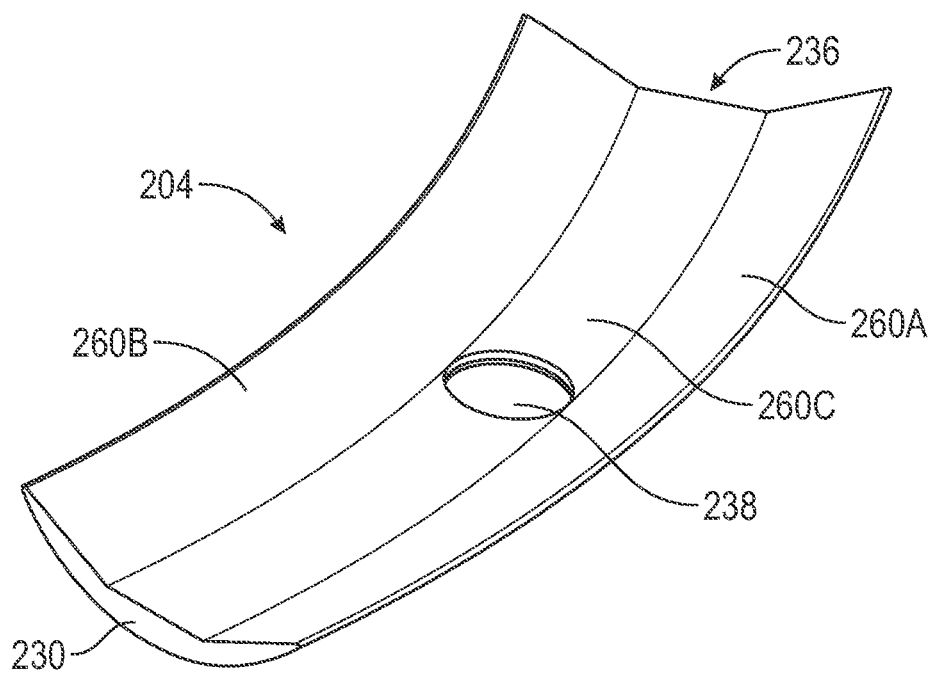
FIG. 6 is a perspective view of an interior of the bottom shell of FIGS. 2 and 3 showing a location for a load cell.
Figure 7:
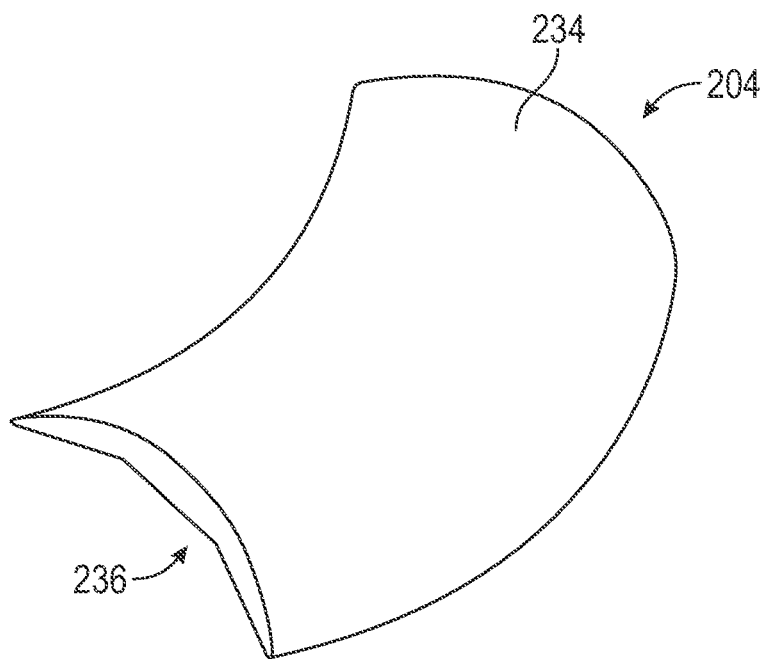
FIG. 7 is a perspective view of an exterior of the bottom shell of FIGS. 2 and 3 showing a curved outer surface.

FIG. 6 is a perspective view of internal surface 232 of bottom shell 204 of FIGS. 2 and 3 showing a location for load cell 206. FIG. 7 is a perspective view of external surface 234 of bottom shell 204 of FIGS. 2 and 3. FIGS. 6 and 7 are discussed concurrently.

Internal surface 232 can comprise anterior panel 260A, posterior panel 260B and center panel 260C. Anterior panel 260A, posterior panel 260B and center panel 260C can align with anterior panel 254A, posterior panel 254B and center panel 254C of top shell 202, respectively. Alignment of such panels can limit or inhibit lateral, e.g., anterior-posterior, movement between top shell 202 and bottom shell 204.

Anterior panel 260A, posterior panel 260B and center panel 260C can allow bottom shell 204 to be moved axially relative to top shell 202 without contact being achieved between top shell 202 and bottom shell 204. Center panel 260C can include socket 238 for receiving load cell 206. Socket 238 can align with pedestal 258 (FIG. 5). Socket 238 can be recessed into center panel 260C to hold load cell 206 in place. Load cell 206 can be press fit or force fit into socket 238 or can be held in place via one or more fasteners, adhesive or glue.

External surface 234 can comprise a smooth surface to abut with a surface of a rib retractor, such as flange 120A (FIG. 1). External surface 234 can be arcuate from front-to-back to provide contact with flange 120A. External surface 234 can be arcuate from side-to-side to conform with the natural curvature of a rib bone. Bottom shell 204 can be rigid to transmit force to load cell 206.

Figure 8:
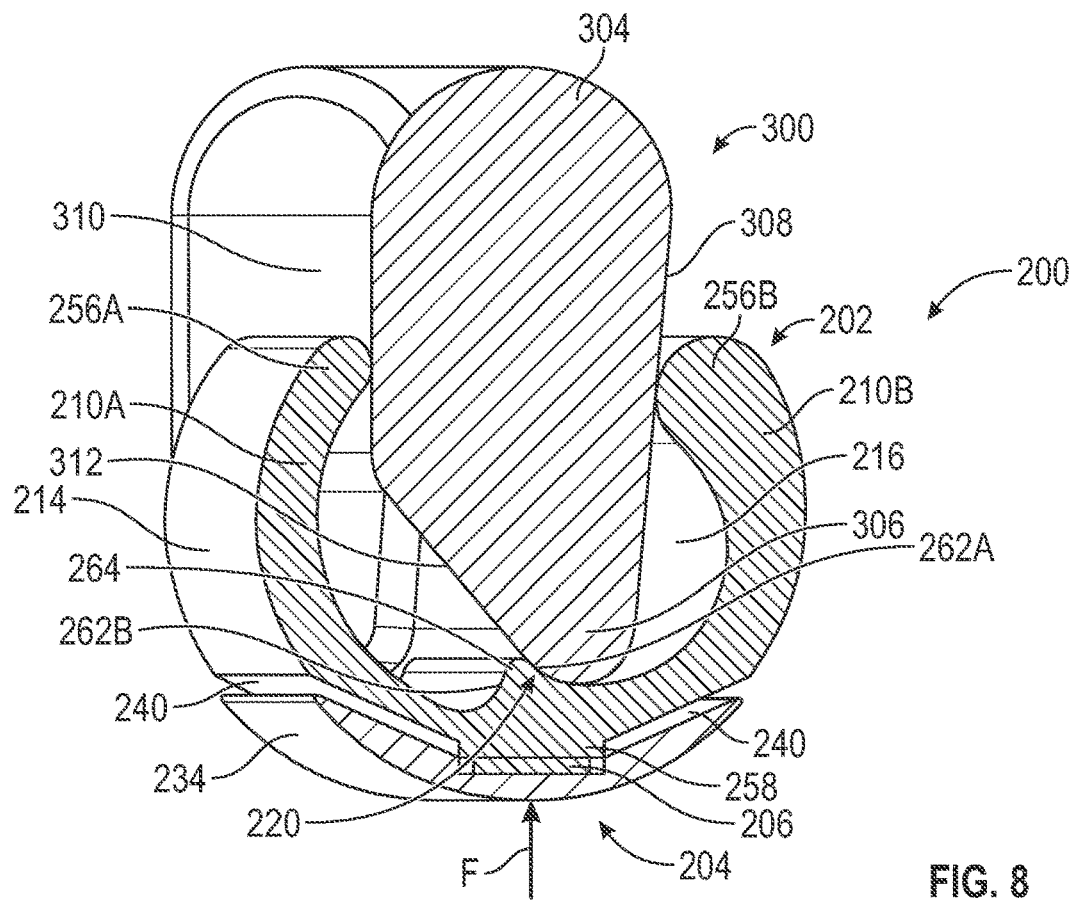
FIG. 8 is a cross-sectional end view of a rib clip of the present disclosure attached to a rib bone showing a location of a load cell between top and bottom shells.
Figure 9:
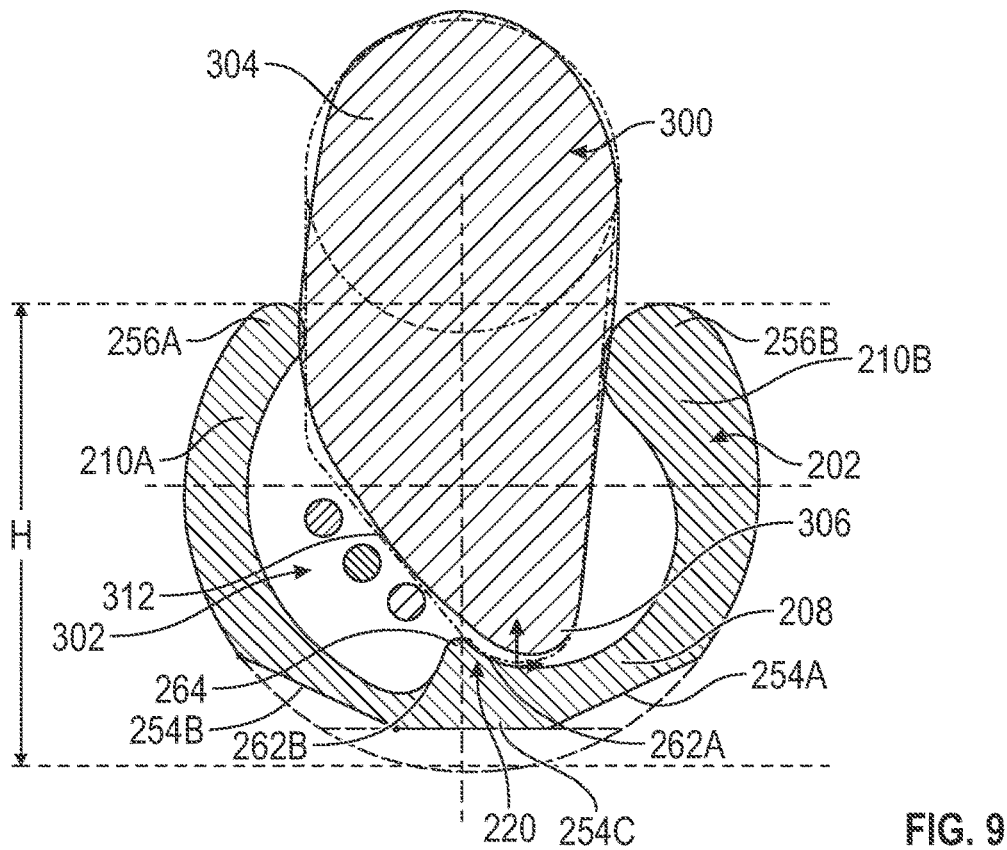
FIG. 9 is a cross-sectional end view of a rib clip of the present disclosure attached to a rib bone with associated nerve structure illustrated.

FIG. 8 is a cross-sectional end view of rib clip 200 of the present disclosure attached to rib bone 300 showing a location of load cell 206 between top shell 202 and bottom shell 204. FIG. 9 is a cross-sectional end view of rib clip 200 of the present disclosure attached to rib bone 300 with associated nerve structure 302 illustrated. In examples, rib bone 300 can comprise superior rib bone 106A of FIG. 1. FIGS. 8 and 9 are discussed concurrently.

Rib bone 300 can have a generally teardrop shape comprising main body 304 and tip 306. Main body 304 can be bulbous and tip 306 can be narrower than main body 304. Main body 304 can be located in a superior position and tip 306 can be located in an inferior position. Main body 304 can comprise anterior wall 308 and posterior wall 310.

Top shell 202 of rib clip 200 can be attached to rib bone 300. First arm 210A can be positioned along posterior wall 310 and second arm 210B can be positioned along anterior wall 308. Ridge 220 can be positioned against tip 306. As such, much of internal surface 216 of elongate body 208 of top shell 202 can be spaced from rib bone 300. Ridge 220 can be shaped to be positioned against the posterior side of tip 306. As such, tip 306 can fit within anterior pocket 250A and nerve structure 302 can fit within posterior pocket 250B.

Ridge 220 can be shaped to fit against the anatomy of rib bone 300. Anterior surface 262A can be concave to receive tip 306. Posterior surface 262B can be concave to provide space for nerve structure 302. Posterior surface 262B can be lower, e.g., further away from first tip 256A and second tip 256B, to provide additional clearance for nerve structure 302. As such, first arm 210A can be thinner at posterior panel 254B than second arm 210B is at anterior panel 254A. Proximal tip 264 of ridge 220 can be sloped or angled in the posterior direction, e.g., toward first arm 210A and away from second arm 210B. As such, ridge 220 can be sloped similarly to the natural angling of distal surface 312 of rib bone 300.

In use, force F can be applied to bottom shell 204. Socket 238 (FIG. 6) can have an inferior surface that is orthogonal to tip 306. Also, pedestal 258 can have a superior surface configured to be orthogonal to tip 306. Thus, load cell 206 can be positioned between socket 238 and pedestal 258 orthogonal to tip 306. Pedestal 258 can act as a load concentrator to focus force applied to bottom shell 204 onto load cell 206. In additional example, other load concentrators, such as a projection or flange, can be located on bottom shell 204 or top shell 202 to concentrate force or loading onto load cell 206. Bottom shell 204 can be attached to top shell 202 through load cell 206. As such, gap 240 can be arranged between top shell 202 and bottom shell 204. Bottom shell 204 can transmit force F to load cell 206. Rigidity of bottom shell 204 can ensure that most or all of the magnitude of force F can be transmitted to load cell 206. Similarly, rigidity of top shell 202 can prevent top shell 202 from absorbing force F. Thus, force F can deform or deflect load cell 206 to register the magnitude of force F thereto. Once load cell 206 is fully deformed or deflected for the given force F, force F can be transmitted to top shell 202 and then to tip 306. Shaping of top shell 202 can ensure that force F is transmitted to tip 306 and not to nerve structure 302. Contact of first tip 256A with posterior wall 310 and of second tip 256B with anterior wall 308 can ensure that top shell 202 stays aligned with rib bone 300 to ensure force F is transmitted to tip 306 and not nerve structure 302. As such, top shell 202 can remain stationary relative to rib bone 300 when force F is applied, while bottom shell 204 can be brought closer to top shell 202 and rib bone 300 when force F is applied due to deformation or deflection of load cell 206. As such, gap 240 can be reduced in height during application of force F and any deformable layers or springs therebetween can be deformed.

Shrinking of gap 240 due to load cell 206 absorbing force F can cause electronics of load cell to register the magnitude of force F. In particular, an electronic signal can be generated that corresponds to the amount of deformation or deflection of load cell 206, or, more particularly, the amount of deformation or deflection of a sensor, such as a strain gauge, load cell transducer or piezoelectric sensor attached to load cell 206. The electronic signal generated by the sensor attached to load cell 206 can be transmitted to a communication device of load cell 206. The communication device can generate a wireless signal indicative of the magnitude of force F. The wireless signal can then be read by a computer or interrogation device to be communicated to a user, such as by a visual display screen or the like. As discussed herein, the electronic signal indicative of the magnitude of force F can be compared to database information to provide warnings, guidance and diagnoses to a user of rib clip 200.

Figure 10:
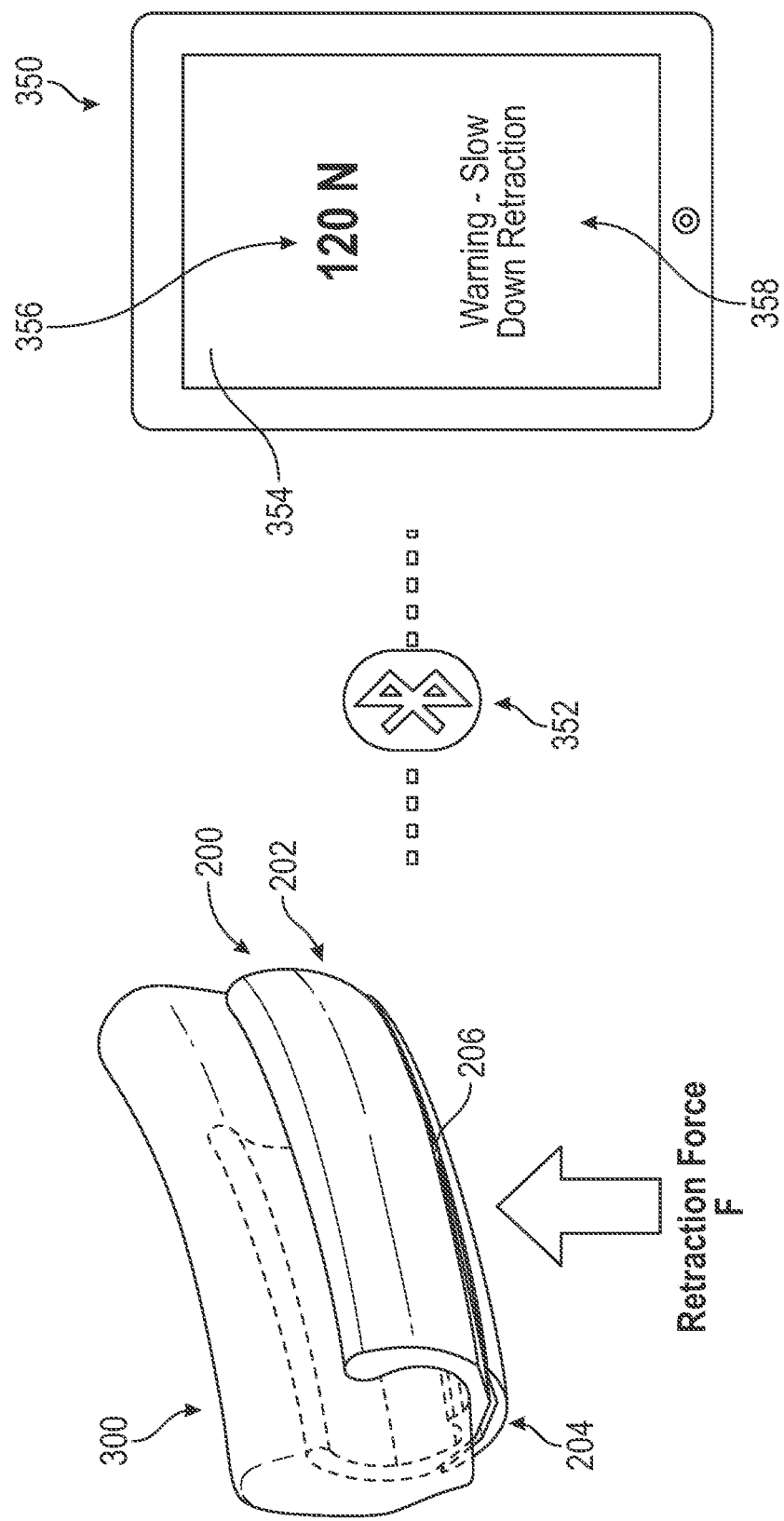
FIG. 10 is a schematic illustration showing a rib clip of the present disclosure attached to a rib bone and in electronic communication with a computing device.

FIG. 10 is a schematic illustration showing rib clip 200 of the present disclosure attached to rib bone 300 and in electronic communication with computing device 350. Load cell 206 of rib clip 200 can be in communication with computing device 350 via communication signal 352. Communication signal 352 can comprise any suitable wireless link or signal, such as Bluetooth, Wi-Fi, Zigbee and the like. Information from load cell 206 can be communicated to computing device 350. Communication signal 352 can provide real-time information from load cell 206 to computing device 350. Thus, as information being generated by load cell 206 changes in real-time as rib retractor 104 (FIG. 1) is being used, real-time force data can be transmitted to computing device 350. Computing device 350 can comprise display screen 354 on which various forms of information can be displayed to a user. Display screen 354 can provide numerical indicia of output of sensors within load cell 206. For example, display screen 354 can provide numerical indicia 356. In the illustrated example, numerical indicia 356 can provide an indication of the amount of force being applied to rib clip 200 by rib retractor 104 of FIG. 1, such as "120 Newtons." Display screen 354 can additionally provide instructions for a user of rib clip 200. For example, display screen 354 can provide written indicia 358. In the illustrated example, written indicia 358 can provide instructions to reduce the rate retraction. In additional examples, written indicia 358 can provide guidance as to reducing retraction force F or stopping increasing of retraction force F.

The present inventors have recognized that biological matter associated with the thoracic wall, such as rib bones and surrounding muscles and connective tissue, can exhibit viscoelastic properties. That is, the thoracic wall matter can act hard or stiff when subject to a rapid or sudden force, but will act soft or flexible when subject to slow or gradual force. As such, a lower amount of force applied over a longer period of time can achieve the same result, e.g., retraction distance, as a higher force applied over a short amount of time, but with much less trauma being inflicted on the biological matter. Discussion of the properties of rib bones are described in Koganti, D., Beekley, A. C. (2018). Fundamentals of Exploratory Thoracotomy for Trauma. In: Palazzo, F. (eds) Fundamentals of General Surgery. Springer, Cham. https://doi.org/10.1007/978-3-319-75656-1_21.

Description of the mechanics of bone matter in the chest wall or thoracis wall are described in 1) Chanoit, G., Pell, C. A., Bolotin, G. et al. Retraction mechanics of Finochietto-style self-retaining thoracic retractors. BioMed Eng OnLine 18, 45 (2019). https://doi.org/10.1186/s12938-019-0664-z; 2) Bolotin G, Buckner G D, Campbell N B, Kocherginsky M, Raman J, Jeevanandam V, Maessen J G. Tissue-disruptive forces during median sternotomy. Heart Surg Forum. 2007; 10(6):487-92. doi: 10.1532/HSF98.20071121. PMID: 18187385; and 3) Gil Bolotin, Gregory D. Buckner, Nicholas J. Jardine, Aaron J. Kiefer, Nigel B. Campbell, Masha Kocherginsky, Jai Raman, Valluvan Jeevanandam, A novel instrumented retractor to monitor tissue-disruptive forces during lateral thoracotomy, The Journal of Thoracic and Cardiovascular Surgery, Volume 133, Issue 4, 2007, Pages 949-954, ISSN 0022-5223, https://doi.org/10.1016/j.jtcvs.2006.09.065. (https://www.sciencedirect.com/science/article/pii/S0022522306020496)

Various retraction profiles, i.e., force over time, based on historical data collected during thoracotomy procedures can be stored in computing device 350, as well as post-operative outcomes for those retraction profiles, i.e., the amount of pain or discomfort experiences by the patient, for comparison to real-time data collected form a patient during a specific procedure. As such, real-time data being collected can be compared to historical retraction profiles to identify if the retraction process for the current patient is tracking historical retraction profiles that have resulted in trauma to biological matter or undesirable, e.g., painful, post-operative outcomes even if bone fracture or nerve crushing has been avoided.

In examples, computing device 350 can have stored in memory 406 (FIG. 11), e.g., a non-transitory computer readable medium, database information relating to levels of force and rates of force that can cause trauma in typical human rib bones, associated nerves or that can cause post-operative recovery issues. Computing device 350 can provide warnings, instructions or indications when the magnitude or time profile of force F matches pre-established threshold force levels or time profiles. Warnings can be in the form of visual indicia displayed on display screen 354 or other formats. Computing device 350 can output various indicia, text, font or symbols indicating feedback and guidance for the retraction procedure. Warnings and instructions can also include tactile feedback, e.g., vibration of computing device 350, or audio warnings and instructions, such as beeps of voice prompts. For example, green, yellow and red indicators on display screen 354 can indicate safe retraction levels, retraction levels approaching trauma levels, or that no further retraction force should be applied, respectively.

For example, levels of force that can cause bone fracture can be stored. Thus, as force F approaches levels of force where fracture can typically occur, computing device 350 can provide warnings, e.g., a beep or an update of written indicia 358, to stop increasing the amount of force F. Additionally, rates of applying force, e.g., time varying application of force F, that can cause post-operative pain can be stored. Thus, as the rate that force F is increased to levels where post-operative pain, or overly uncomfortable levels of pain, can occur, computing device 350 can provide warnings, e.g., a beep or an update of written indicia 358, to slow down the rate that force F is being increased.

In examples, simple force data, such as "retraction force equals X Newtons" indicating the magnitude of the real-time retraction force can be output, similar to what is shown in FIG. 10 for numerical indicia 356. In examples, instructions such as "slow down rate of retraction" and "pause retraction" can be provided at written indicia 358 to allow for tissue to relax. In examples, warnings such as "risk of nerve crushing," "risk of rib fracture" and "risk of adjacent bone fracture" can be displayed at written indicia 358. In examples, warnings regarding post-operative pain control can be provided, such as "retraction above X Newtons can result in high levels of post-operative pain" or "it is recommended that a dosage of X of painkiller Y be used when retraction forces exceed Z Newtons." Warnings regarding other post-operative considerations can additionally be provided, such as those concerning length of stay at treatment facilities.

As is discussed in greater detail with reference to FIG. 11, load cell 206 can be configured to transmit data to computing device 350 relating to performance of rib clip 200, such as the ability of rib clip 200 to receive retraction force F.

Figure 11:
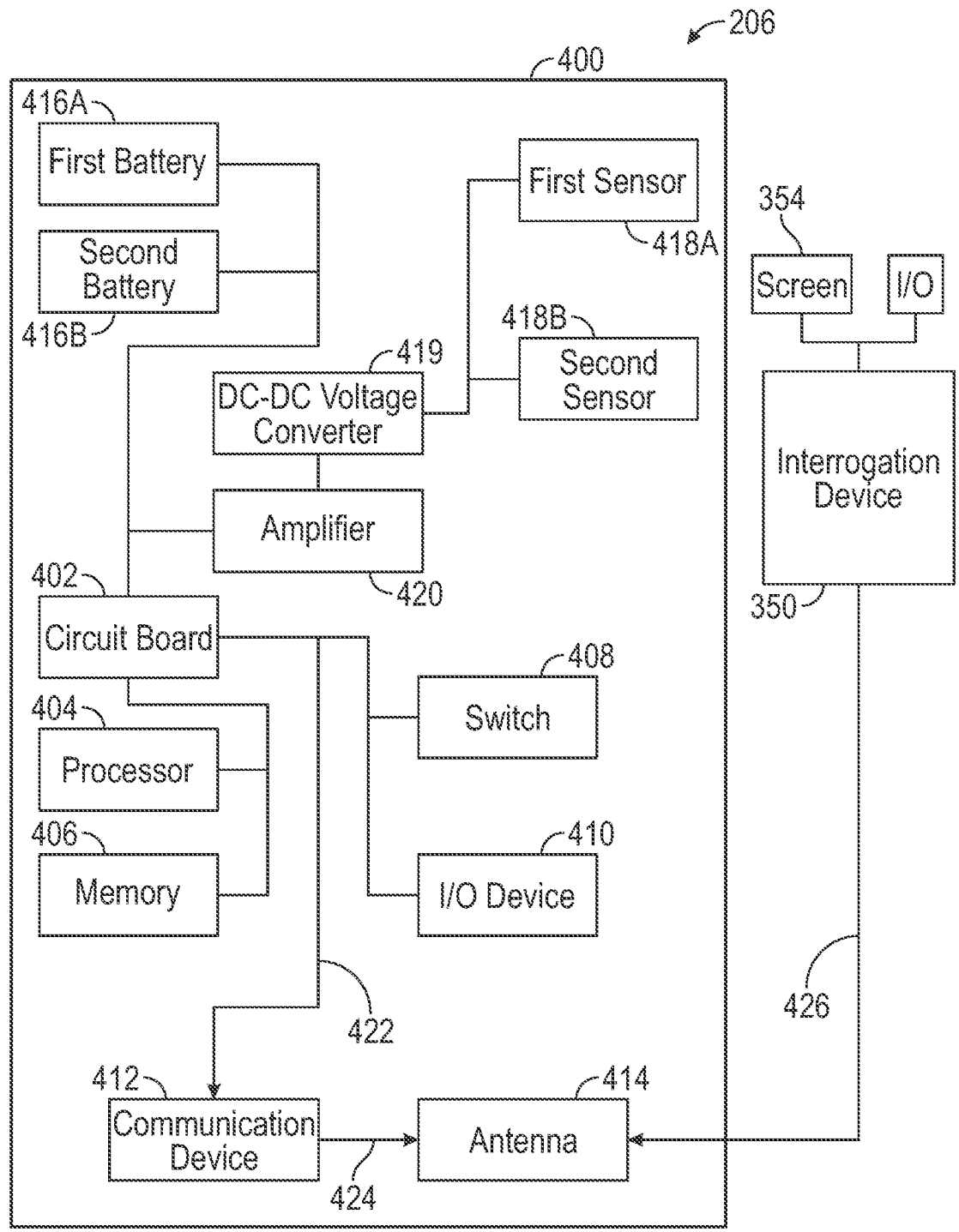
FIG. 11 is a schematic view of a load cell used in the force-sensing rib clips of the present disclosure showing various sensors, communication devices and electronics components.

FIG. 11 is a block diagram illustrating components of load cell 206, including housing 400. Load cell 206 can comprise various components for operating as a computing or electronics device, such as circuit board 402, processor 404 and memory 406. Load cell 206 can additionally include components for allowing communication with external devices and operators, such as switch 408, input/output (I/O) device 410, communication device 412 and antenna 414. Load cell 206 can receive power from first battery 416A and second battery 416B.

Load cell 206 can receive input from one or more sensors, such as first sensor 418A and second sensor 418B. Output of first sensor 418A and second sensor 418B can be provided to signal processing components, such as converter 419 and amplifier 420.

Sensors 418A and 418B can comprise a variety of different sensors, such as force, temperature, pH, acceleration, distance, vibration, impact, position, motion, capacitance, conductance, impedance, proximity and the like. Only one of sensors 418A and 418B can be included in load cell 206 or more than two sensors can be included in load cell 206. In examples, first sensor 418A can comprise a force sensor and second sensor 418B can comprise a proximity sensor. However, load cell 206 can be provided with additional sensors, such as an accelerometer. In examples, load cell 206 can have only a single sensor, such as a force sensor. Force sensors can comprise and device suitable for determining varying forces, such as load cell transducers, strain gages and force sensing resistors.

Load cell 206 can be in communication with computing device 350. Computing device 350 can comprise various electronics devices for obtaining information from load cell 206 and providing information to load cell 206, such as a personal computer, a desktop, a mobile computing device, a mobile phone, a tablet, a notebook, a base station, a dongle and other electronics devices.

Housing 400 can comprise a structural component to hold and support other components of load cell 206. Housing 400 can be configured to allow external factors to be applied to first sensor 418A and second sensor 418B. In examples, housing 400 can provide space of all of the electronics components of load cell 206. Thus, housing 400 can include features to allow retraction force F (FIG. 10) to be applied to first sensor 418A, such as a window, a button or a deflector. In additional examples, first sensor 418A can be located remotely from housing 400. Housing 400 can be made of a medical grade plastic material, or can be made of other medical grade materials, such as stainless steel. Housing 400 can be made of a transparent or translucent material to facilitate transmission of light through housing 400 to improve visibility of any light sources disposed in or on housing 400. Housing 400 can be sealed to keep the components therein dry and away from engagement with the environment of load cell 206.

Circuit board 402 can comprise a structural component for electrically and structurally coupling electrical components of load cell 206. For example, circuit board 402 can comprise a silicon wafer or a chip onto which electrical couplings are attached for electronic coupling of processor 404, memory 406, sensors 418A and 418B and the like.

Processor 404 can comprise an integrated circuit that controls operation of components of load cell 206, such as I/O device 410, communication device 412 and sensors 418A and 418B. Processor 404 can execute instructions stored in memory 406 to operate components of load cell 206, such as sensors 418A and 418B. In examples, a processor and memory are not needed and load cell 206 can operate as a simple integrated circuit whereby output of sensors 418A and 418B can be directly transmitted by communication device 412 after conditioning by converter 419 and amplifier 420.

Memory 406 can comprise any suitable storage device, such as non-volatile computer-readable memory, magnetic memory, flash memory, volatile memory, programmable read-only memory and the like. Memory 406 can include instructions stored therein for processor 404 to control operation of load cell 206. For example, memory 406 can include instructions for operating I/O device 410, communication device 412 and sensors 418A and 418B, as well as coordinating output from load cell 206. Memory 406 can additionally include reference data for comparing to data from sensors 418A and 418B, such as threshold force and rate conditions, historical force and rate profiles or other information, that can be used to assess the effectiveness of retraction force being applied to rib bone 300 (FIG. 8).

Switch 408 can comprise an on/off switch for providing power from first battery 416A and second battery 416B to sensors 418A and 418B, etc. Switch 408 can comprise an "alternate action" switch when transitioning between open or closed states. In alternate action switches, a switch can be flipped for continuous "on" or "off" operation. Switch 408 can comprise a toggle switch, a knife switch, a relay or a push-button switch. In examples, load cell 206 does not include switch 408 and load cell 206 can be powered on so long as one of first battery 416A and second battery 416B is at least partially charged.

I/O device 410 can comprise one or more devices for receiving input from and sending output to a user of load cell 206. In order to operate or obtain information from load cell 206, I/O device 410 can comprise a button, a knob, a dial and the like. In examples, I/O device 410 can be omitted and load cell 206 can communicate with computing device 350 in order to operate load cell 206.

I/O device 410 can comprise devices for providing visual and audio feedback. I/O device 410 can comprise a device for producing light waves, such as incandescent light bulbs, light-emitting-diodes and the like. In examples, I/O device 410 can be configured for emitting different colors or wavelengths of light. I/O device 410 can provide visual indications of when load cell 206 is performing different functions, such as actively sensing. For example, I/O device 410 can be configured to emit orange, yellow and green light, so that an operator can confirm that different functions of load cell 206 are being performed, or that a loss of communication or a malfunction of load cell 206 is occurring.

I/O device 410 can include or comprise a device for making waves, such as a sound wave or a vibration wave. In an example, I/O device 410 can comprise an auditory device, such as a speaker or amplifier for producing an auditory signal or sound to indicate that load cell 206 is in communication with computing device 350. In other examples, I/O device 410 can comprise tactile device, such as a reciprocating or oscillating device, for producing a vibration that can be felt by a patient. In other examples, I/O device 410 can generate a wave that can communicate with a device worn by a surgeon at computing device 350 that can vibrate when receiving the wave.

Communication device 412 can comprise one or more devices for receiving input from computing device 350 or providing an output to computing device 350 via various signals. Communication device 412 can receive signal 422 from circuit board 402 from any of the components connected thereto. Communication device 412 can provide signal 424 to antenna 414, which can facilitate transmission of signal 424 to computing device 350 via wireless signal 426. Computing device 350 can thereafter, for example, display on display screen 354 an indication of information from load cell 206. Antenna 414 can be positioned outside of or extend partially outside of housing 400.

Communication device 412 can receive signal 426 from computing device 350 via antenna 414 for storing information on memory 406 or providing information to processor 404 for operating switch 408, sensors 418A and 418B, communication device 412 and other components of load cell 206. Signal 426 can establish a communication link between computing device 350 and load cell 206. In examples, communication device 412 and computing device 350 can communicate using wireless communications signals, such as Bluetooth, WiFi, Zigbee, infrared (IR), near field communication (NFC), 3GPP or other technologies. In examples, communication device 412 can comprise a wired connection or can include a port for receiving a wire for a wired connection. In examples, communication device 412 can communicate using one of more of the IEEE 802.15.6-2012 protocol, an MICS protocol and an MBANs protocol.

First battery 416A and second battery 416B can comprise energy storage devices such including an electrochemical cell, such as an alkaline or zinc-manganese battery. In examples, first battery 416A can comprise a primary, or non-rechargeable battery, and second battery 416B can comprise a secondary, or rechargeable battery. In examples, one or both of first battery 416A and second battery 416B can comprise one or more capacitors that can be charged via a charging device, such as via an inductance signal, a magnetic signal or an RF energy signal. First battery 416A and second battery 416B can be configured to provide power to different components of load cell 206. First battery 416A can provide long term battery power and can provide power to low-frequency sensor operations over the lifetime of load cell 206. Second battery 416B can provide short term battery power and can provide short duration, high frequency sensor operations. Load cell 206 can include only one of first battery 416A and second battery 416B.

Load cell 206 can be customized to include only the sensors and input and output devices that are desired for a particular procedure or to make load cell 206 a reusable or single-use device.

Figure 12:
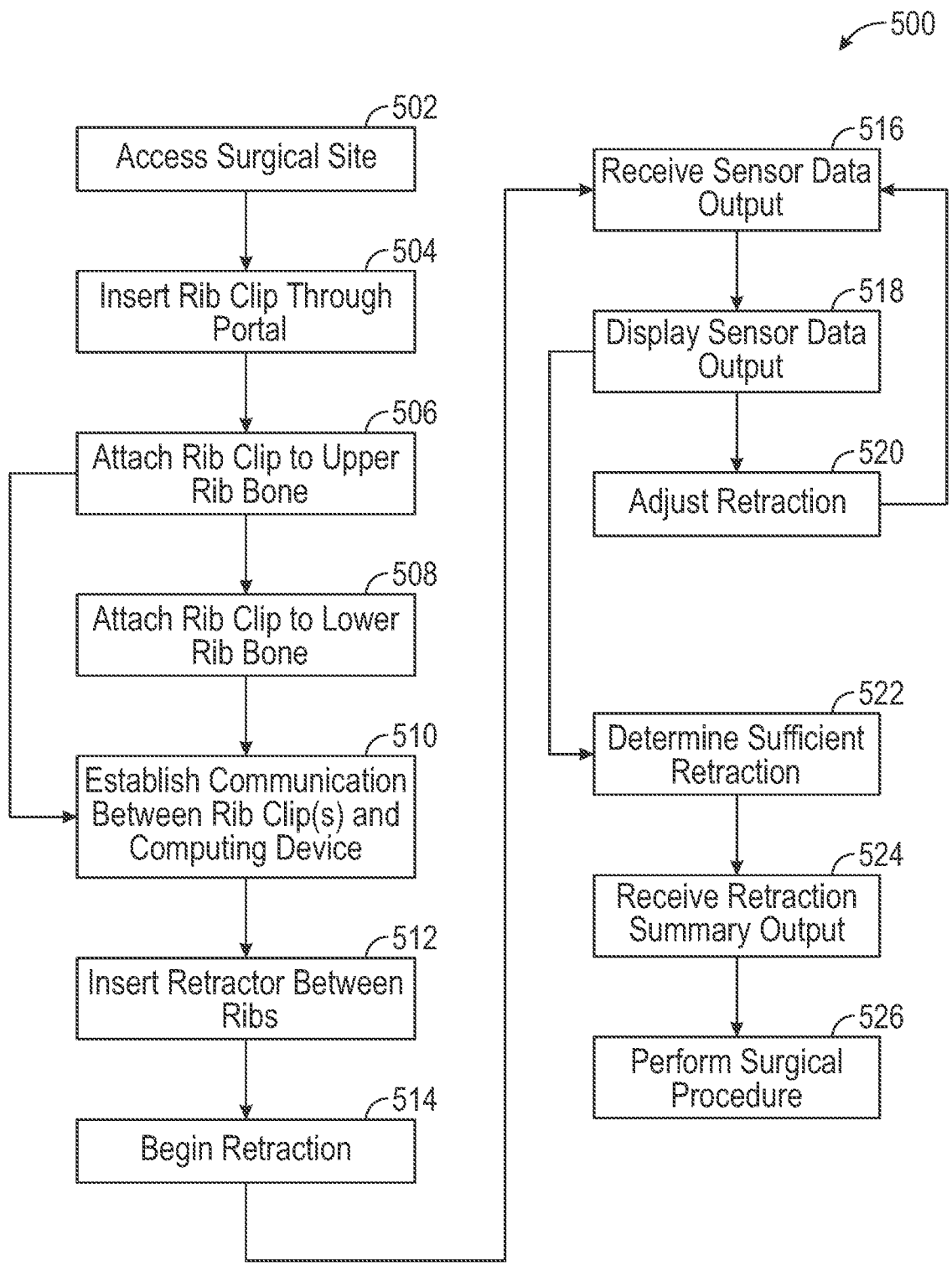
FIG. 12 is a line diagram illustrating operations of methods of the present disclosure relating to obtaining real-time feedback of force being applied to rib bones during a thoracotomy procedure using force-sensing rib clips of the present disclosure.

FIG. 12 is a line diagram illustrating operations of methods of the present disclosure relating to providing trauma shielding to one or more rib bones and obtaining real-time feedback of force being applied to rib bones during a thoracotomy procedure. Method 500 can comprise operation 502 through operation 526 that describe various procedures for obtaining force data, as well as other data, from rib clips of the present disclosure during a retraction process. In various examples, additional operations consistent with the devices, systems methods and operations described herein can be included. Likewise, some of operation 502-operation 526 can be omitted.

At operation 502, a surgical site can be accessed. For example, an incision can be made in the thorax of a patient proximate a rib cage. The incision can be opened to expose a pair of rib bones. Conventional thoracotomy techniques can be used to prepare a portal for accessing rib bones.

At operation 504, a rib clip can be inserted through an access portal formed by the incision of operation 502. In examples, rib clip 200 of the present disclosure can be used. Rib clip 200 of the present disclosure can be attached to a superior rib bone to be retracted. The rib clip can be positioned proximate an inferior side of the rib bone with first arm 210A and second arm 210B extending upward.

At operation 506, a first rib clip can be attached to an upper or superior rib bone. A surgeon can manually position the rib clip adjacent the rib bone and push first arm 210A and second arm 210B across the rib bone to seat ridge 220 at an inferior-most point of the rib bone. In examples, first arm 210A and second arm 210B can flex to fit over the rib bone and to apply pressure to the rib bone to hold the rib clip in place. The rib clip can be positioned around the inferior side of the rib bone to provide protection for intercostal nerve structure located on a posterior-inferior portion of the rib bone.

At operation 508, a second rib clip can be attached to a lower or inferior rib bone opposing the first rib clip installed at operation 506. A rib clip can be positioned on the superior side of the rib bone immediately inferior of the rib bone to which rib clip 200 is attached. The second rib clip can comprise a sensor-enabled rib clip or can comprise a simple mechanical shielding device configured for seating on a superior side of a rib bone (e.g., top shell 202 without ridge 220, load cell 206 and bottom shell 204). In examples, a second rib clip can be omitted and method 500 can proceed from operation 506 directly to operation 510.

At operation 510, communication can be established between the first rib clip and the second rib clip, and between the first and second rib clips and an external computing device. In examples, the first rib clip of operation 506 and the second rib clip of operation 508 can be configured to communicate wirelessly with each other, such as to share position data that can be used to determine the retraction distance. In examples, the first rib clip of operation 506 can be placed in wireless communication with computing device 350 (FIG. 10).

At operation 512, a rib retractor can be inserted between the superior and inferior rib bones. Rib retractor 104 (FIG. 1) can be inserted on the inferior side of the rib clip installed at operation 506. Rib retractor 104 can be positioned such that fixed blade 112A is anterior of the superior rib bone and flange 120A is inferior of the superior rib bone. As such, fixed blade 112A can be positioned to engage arm 210B of rib clip 200 and flange 120A can be positioned to engage bottom shell 204 of rib clip 200. Rib retractor 104 can also be positioned such that mobile blade 112B is anterior of the inferior rib bone and flange 120A is superior of the inferior rib bone. As such, mobile blade 112B can be positioned to engage bone of the inferior rib bone or a rib shield placed along the inferior rib bone.

At operation 514, the retractor can be operated by a surgeon or other technician to begin retracting the upper and lower rib bones. For example, handle 116 or rib retractor 104 can be operated to push mobile blade 112B along track 114 to increase distance D (FIG. 1). Thus, fixed blade 112A and mobile blade 112B can push against the superior and inferior rib bones, applying force thereto.

At operation 516, sensors within one or more rib clips can output data from the rib clips. The output can be received by an external interrogation device, such as computing device 350. Specifically, sensor output from rib clip 200 placed around the superior rib bone can output from rib clip 200. For example, a pressure sensor comprising first sensor 418A (FIG. 11) can output pressure or force data. Converter 419 and amplifier 420 can condition the raw output of first sensor 418A for use by other electronics, such as be converting the current to a level and magnitude suitable for use with other electronics of load cell 206. In examples, conventional conversion and amplifying techniques can be used. Communication device 412 can receive the conditioned sensor data and provide the conditioned sensor data to antenna 414 for broadcasting a wireless signal indicative of or carrying the conditioned sensor data.

At operation 518, sensor data received by the external interrogation device can be displayed. For example, computing device 350 (FIG. 11) can receive the conditioned sensor data of rib clip 200. Software operating on computing device 350 can be programmed to display, compare and interpret the conditioned sensor data. As discussed herein, simple force data can be displayed on display screen 354, instructions to adjust the retraction force or rate can be displayed on display screen 354, warnings regarding potential bone and tissue damage can be displayed on display screen 354 and instructions for post-operative treatment can be displayed on display screen 354.

At operation 520, the retraction procedure can be adjusted, to cause a change in the sensor output. A surgeon can read the data, warning and instructions displayed on display screen 354. The surgeon can utilize their own clinical judgment to interpret the data and decide whether or not to follow any instructions or heed any warnings. For example, the surgeon can decide to stop retraction, increase or decrease the rate of increasing retraction force and increase or decrease the total retraction force applied.

At operation 522, it can be determined by a surgeon or technician, or by the rib clips, that a sufficient amount of retraction has been obtained. A surgeon can decide that distance D (FIG. 1) has been increased sufficiently to perform the desired thoracotomy procedure. The surgeon can also decide that the superior and inferior rib bones have been subject to a maximum threshold of force or retraction and that additional retraction would not be acceptable for the patient, e.g., unacceptable levels of trauma might be inflicted on the rib bone or intercostal nerve structure, or the patient might thereafter need increased levels of pain medications.

At operation 524, a summary of the sensor output of the rib clips during the retraction procedure can be output as a report. For example, computing device 350 can prepare all the force data collected by rib clip 200 during the procedure for publication of a report in an electronic file format or a paper print-out. The report can include all of the force levels at time intervals for the procedure. For example, the report can include force magnitude in Newtons for each second of the procedure. The force magnitude can be plotted over the time intervals in a graphical format. Additionally, any and all instructions and recommendations provided by computing device 350 during the procedure can be included in the report. The report can be used to evaluate the patient post-operatively and prepare and adjust post-operative pain management plans. Furthermore, data from the report can be stripped of personal information for the patient and added to a database or atlas of information in addition to post-operative outcomes of that patient, such as any rib fracturing, nerve damage or lingering pain issues. Such data can be used to prepare and refine the retraction warnings and instructions described herein.

At operation 526, the surgical procedure can be performed through the access portal and the retracted upper and lower rib bones. Typical procedures benefitting from thoracotomy can be performed, such as to reach the heart, lungs, esophagus, and spine. In examples, lung cancer resections can be performed.

After the surgical procedure is performed, the rib retractor can be removed from the upper and lower rib bones, any of the rib clips attached to the upper and lower rib bones can be removed, and the access incision in the patient can be closed up with appropriate suturing or the like.

The systems, devices and methods discussed in the present application can be useful in providing rib clips that have sensors to collect patient and procedure data. The rib clips can be appropriately sized and shaped to fit on rib bones of a wide variety of skeletal frames, such as men, women, and children. The rib clips described herein can be outfitted with electronics packages that can be configured to output the collected patient and procedure data, such as via a wireless communication device, to provide guidance and instructions to a surgeon.

The rib clips of the present disclosure can be minimalist in design, e.g., an electronics module positioned between a rib-attaching device and a force-conveying component. The rib-attaching device can have a shape to fit under natural anatomy of a rib bone, while simultaneously being positioned around the sensitive neurovascular bundle to protect the nerves from retraction and instrument irritation. The rib clips can provide real-time force feedback data to the surgeon to mitigate nerve damage or rib fracture leading to chronic pain.

Chronic post-operative pain, which persists past the expected post-op recovery time, is a significant burden on the global health care system. Thoracic surgery, and in particular thoracotomy, has an unusually high rate of progression to chronic pain (57% 3 months post-op), outpacing other surgeries in post-op opioid use by a factor of three (19% vs 7%). Even in the acute post-operative setting, thoracotomy procedures are associated with complications that can be burdensome for the patient, the provider, and the healthcare system at large including pulmonary complications and prolonged hospital length of stays.

The high levels of post-thoracotomy pain and associated complications can in part be attributed to intercostal nerve damage. The rib-spreading retractors used in these procedures can transmit large forces onto the neurovascular bundle in the intercostal space, which can lead to tissue damage and pain. In this regard, the surgical procedure itself may contribute to post-thoracotomy pain as much if not more than the underlying pathology being treated. Some thoracic surgeons believe nerve damage is unavoidable and that the best option is to treat the resulting pain pharmacologically post-op.

The rib clips of the present disclosure can help solve these problems by preventing the nerve damage from occurring in the first place. The shape of the rib clips of the present disclosure can protect the neurovascular bundle by providing a surface for the retractor blades to press against without crushing the intercostal nerve.

The rib clips of the present disclosure can be adapted to the teardrop-shaped anatomy of a rib bone and can feature a pocket configured to accommodate the rib neurovascular bundle. This can ensure that the retractor transfers its forces to bone matter of the rib bone without crushing the sensitive nerves.

Rib clips of the present disclosure can be equipped with a pressure sensor capable of providing real-time feedback to the user, allowing intra-op adjustment to avoid unnecessary damage to the nerves, bone, and surrounding tissue. A wireless transmitter, such as a Bluetooth transmitter, can communicate with a base station or external interrogation device to display information from the pressure sensor.

The rib clips of the present disclosure can be disposable. The top shell, bottom shell and load cell can have low production costs that can make the rib clips available using a disposable business model.

The rib clips of the present disclosure can reduce the high burden of acute complications, such as retraction forces and intercostal nerve damage associated with high rate of pulmonary complications, hospital length of stay, and intra-op fractures to adjacent ribs.

The rib clips of the present disclosure can reduce the high burden of chronic pain. Chronic pain is a significant burden on health systems worldwide.

The shape of the rib clips of the present disclosure can be configured to avoid damage to the neurovascular bundle while transferring retraction forces to the underside of the rib.

The shape of the rib clips of the present disclosure can be configured to accommodate anatomical variability. The rib clips can be compatible with many patient anatomies, such as through the use of flexible materials or multiple sizes.

The rib clips of the present disclosure can be used to predict nerve and tissue damage. The rib clips of the present disclosure can collect data that can be used to foresee imminent tissue damage or rib fractures based on retraction force/time profiles.

The rib clips of the present disclosure can have flexible mechanical and electronic designs. The body of the rib clip can be comprised of various components, such as a top shell made from injection-molded or extruded polymer and that can be fit around the underside of the rib, a bottom shell that can be made of injection-molded or extruded polymer and that can be configured to engage a rib retractor, a load cell and circuit that is Bluetooth-enabled that can be positioned between the top and bottom shells. The load cell and circuit can comprise a load cell or strain gauge, an operational amplifier, a battery, a DC-DC voltage converter, a custom printed circuit board, and a wireless communication module, e.g., Bluetooth module.

The rib clips of the present disclosure can be curved to adapt to the natural shape of a rib bone, and the cross-section of the rib clips fit on the underside of the superior retracted rib, keeping three points of contact with the rib to maintain stability.

Examples

Example 1 is a force-sensing rib clip comprising: an upper shell comprising: an elongate body; an exterior surface of the elongate body; a rib-receiving channel extending along an interior surface of the upper shell; and a ridge extending along the rib-receiving channel; a lower shell configured to mate with the exterior surface; and a load cell positioned between the upper shell and the lower shell.

In Example 2, the subject matter of Example 1 optionally includes wherein there is a gap between the upper shell and the lower shell and the load cell couples the lower shell to the upper shell.

In Example 3, the subject matter of Example 2 optionally includes a deflection component positioned in the gap between the upper shell and the lower shell, the deflection component comprising a deformable layer or a spring element.

In Example 4, the subject matter of any one or more of Examples 2-3 optionally include wherein: the exterior surface of the upper shell includes a first flat panel located at a distal-most portion of the upper shell opposite the ridge; and the lower shell includes: an exterior surface forming a curved surface; and an interior surface including a second flat panel; wherein the load cell is positioned between the first flat panel and the second flat panel.

In Example 5, the subject matter of any one or more of Examples 1-4 optionally include wherein the load cell comprises: a force sensor; a wireless communication device; and a battery.

In Example 6, the subject matter of Example 5 optionally includes wherein the load cell further comprises a secondary sensor, wherein the secondary sensor comprises one of an accelerometer, a proximity sensor and a distance sensor.

In Example 7, the subject matter of any one or more of Examples 5-6 optionally include wherein the load cell further comprises a voltage converter and an amplifier to condition output of the force sensor.

In Example 8, the subject matter of any one or more of Examples 5-7 optionally include wherein: the force sensor comprises a strain gauge; and the wireless communication device comprises a Bluetooth transmitter.

In Example 9, the subject matter of any one or more of Examples 1-8 optionally include wherein the ridge is sloped upward extending from an anterior position to a posterior position so as to be configured to engage a posterior side of an inferior tip portion of a rib bone.

In Example 10, the subject matter of any one or more of Examples 1-9 optionally include wherein the elongate body of the upper shell comprises an arcuate posterior arm and an arcuate anterior arm forming the rib-receiving channel there between.

In Example 11, the subject matter of Example 10 optionally includes wherein the arcuate posterior arm and the ridge form a posterior pocket within the rib-receiving channel to accommodate a nerve bundle on a rib bone.

Example 12 is a method of receiving real-time feedback during a rib retraction procedure using a force-sensing rib clip, the method comprising: attaching a first force-sensing rib clip to a first rib bone; inserting a rib retractor into an intercostal space between the first rib bone and a second rib bone inferior of the first rib bone; establishing a wireless communication link between the first force-sensing rib clip and an interrogation device; applying a retraction force to the first rib bone and the second rib bone, wherein the retraction force is applied to the first rib bone through the first force-sensing rib clip; outputting force-sensor data from the first force-sensing rib clip to the interrogation device; and displaying force indicia on the interrogation device.

In Example 13, the subject matter of Example 12 optionally includes adjusting the retraction force based on the force indicia displayed on the interrogation device.

In Example 14, the subject matter of any one or more of Examples 12-13 optionally include displaying retraction instructions on the interrogation device based on the force-sensor data.

In Example 15, the subject matter of any one or more of Examples 12-14 optionally include wherein the retraction force applied through the first force-sensing rib clip compresses a load cell within the first force-sensing rib clip.

In Example 16, the subject matter of Example 15 optionally includes pushing a bottom shell of the force-sensing rib clip toward a top shell of the force-sensing rib clip with the retraction force.

In Example 17, the subject matter of Example 16 optionally includes deforming a compressible material between the bottom shell and the top shell.

In Example 18, the subject matter of any one or more of Examples 12-17 optionally include shielding a nerve bundle of the first rib bone from the retraction force with the first force-sensing rib clip.

In Example 19, the subject matter of Example 18 optionally includes engaging a ridge of a rib-receiving channel of the first force-sensing rib clip with a distal tip of the first rib bone.

In Example 20, the subject matter of any one or more of Examples 12-19 optionally include outputting acceleration data from the force-sensing rib clip to the interrogation device.

In Example 21, the subject matter of any one or more of Examples 12-20 optionally include outputting distance data from the force-sensing rib clip to the interrogation device.

In Example 22, the subject matter of any one or more of Examples 12-21 optionally include attaching a second rib clip to the second rib bone.

In Example 23, the subject matter of Example 22 optionally includes establishing a wireless communication link between the second rib clip and the interrogation device.

In Example 24, the subject matter of any one or more of Examples 22-23 optionally include establishing a wireless communication link between the second rib clip and the first force-sensing rib clip.

In Example 25, the subject matter of any one or more of Examples 22-24 optionally include displaying post-operative patient care instructions on the interrogation device based on the force-sensor data output from the first force-sensing rib clip.

Each of these non-limiting examples can stand on its own, or can be combined in various permutations or combinations with one or more of the other examples.

VARIOUS NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A force-sensing rib clip comprising:
   an upper shell comprising:
      an elongate body;
      an exterior surface of the elongate body;
      a rib-receiving channel extending along an interior surface of the upper shell; and
      a ridge extending along the rib-receiving channel;
   a lower shell configured to mate with the exterior surface; and
   a load cell positioned between the upper shell and the lower shell.

2. The force-sensing rib clip of claim 1, wherein there is a gap between the upper shell and the lower shell and the load cell couples the lower shell to the upper shell.

3. The force-sensing rib clip of claim 2, further comprising a deflection component positioned in the gap between the upper shell and the lower shell, the deflection component comprising a deformable layer or a spring element.

4. The force-sensing rib clip of claim 2, wherein:
   the exterior surface of the upper shell includes a first flat panel located at a distal-most portion of the upper shell opposite the ridge; and
   the lower shell includes:
      an exterior surface forming a curved surface; and
      an interior surface including a second flat panel;
   wherein the load cell is positioned between the first flat panel and the second flat panel.

5. The force-sensing rib clip of claim 1, wherein the load cell comprises:
   a force sensor;
   a wireless communication device; and
   a battery.

6. The force-sensing rib clip of claim 5, wherein the load cell further comprises a secondary sensor, wherein the secondary sensor comprises one of an accelerometer, a proximity sensor and a distance sensor.

7. The force-sensing rib clip of claim 5, wherein the load cell further comprises a voltage converter and an amplifier to condition output of the force sensor.

8. The force-sensing rib clip of claim 5, wherein:
   the force sensor comprises a strain gauge; and
   the wireless communication device comprises a Bluetooth transmitter.

9. The force-sensing rib clip of claim 1, wherein the ridge is sloped upward extending from an anterior position to a posterior position so as to be configured to engage a posterior side of an inferior tip portion of a rib bone.

10. The force-sensing rib clip of claim 1, wherein the elongate body of the upper shell comprises an arcuate posterior arm and an arcuate anterior arm forming the rib-receiving channel there between, wherein the arcuate posterior arm and the ridge form a posterior pocket within the rib-receiving channel to accommodate a nerve bundle on a rib bone.

* * * * *